Nov. 13, 1962   W. A. BASON   3,063,490
SHAPE RESTORING APPARATUS
Filed Oct. 2, 1958

INVENTOR.
WILLIAM A. BASON
BY C. J. Rotondi,
A. J. Dupont & H. R. Johns
ATTORNEYS.

United States Patent Office 3,063,490
Patented Nov. 13, 1962

3,063,490
SHAPE RESTORING APPARATUS
William A. Bason, % Alabama Ordnance Works,
Childersburg, Ala.
Filed Oct. 2, 1958, Ser. No. 765,013
2 Claims. (Cl. 153—81)
(Granted under Title 35, U.S. Code (1952), sec. 266)

The invention described herein may be manufactured and used by or for the Government for governmental purposes without the payment of any royalty thereon.

This invention relates to shape restoring apparatus, and more particularly to an apparatus for the restoration of distorted tubular bodies to their oignal shape.

It has particular utility in the rehabilitation of damaged fired cartridge cases as they are received for reloading after use. Prior to the present invention, such cartridge cases were restored to shape by a hand operation requiring an aveage of two and one-half minutes. The herein disclosed apparatus has reduced the time required for this operation from two and one-half minutes to twenty-one seconds. This saving in time obviously is an important consideration where thousands of cartridge cases are to be reconditioned prior to reloading. Another advantage of this invention is the adaptability of the shaping process performed on the tapered conical member to iron many localized or smaller areas at a time.

The invention will be better understood from the following description when considered in connection with the accompanying drawings and its scope is indicated by the appended claims.

Referring to the drawings.

Figure 1:
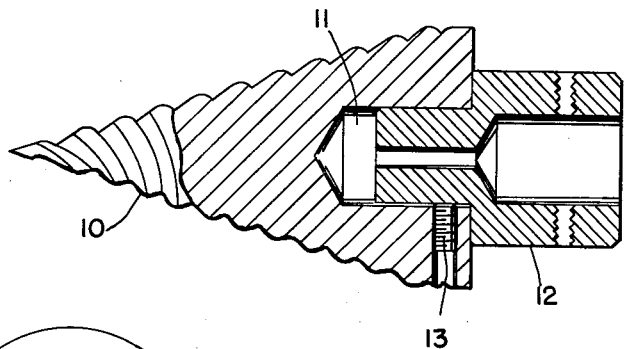
FIG. 1 is a side view, partly in section, of the shape restoring device.
Figure 2:
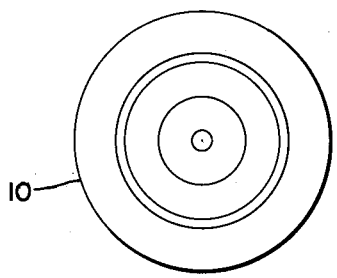
FIG. 2 shows the device as viewed from the top.

In one of its preferred forms, the shape restoring apparatus includes a conical member 10 having a hole 11 adapted to receive a shank 12 through which it is mounted in a drill press. A tapped hole with an allen screw 13 serves to lock the shank 12 to the cone 10.

Figure 3:
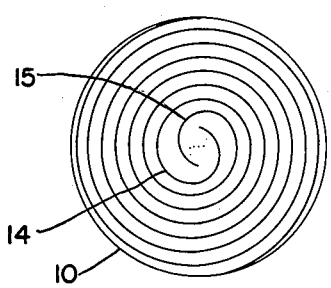
FIG. 3 is a bottom view illustrating the arrangement of the threads which function to iron out the dents in the tubular member.

The working surface of the cone is in the form of two specially cut threads 14 and 15 having rounded crests as shown in FIG. 1 for frictional engagement with an inner surface of a cartridge case (see FIG. 3) starting at the point of the cone and winding clockwise to its base. These threads taper out to zero depth at the large end of the cone. In one satisfactorily operated form of the apparatus, the cone 10 was seven-and-one-quarter inches long with a diameter of a little over four inches at its base and with threads 14 and 15 making five turns throughout the length of the cone.

During the shape restoring operation, the cone is mounted in a drill press rotating counter-clockwise. The base of the damaged cartridge case (not shown) is locked in an air chuck and the cone 10 is slowly fed into the mouth of the case while rotating at a speed of the order of 160 r.p.m. This rotation of the threads 14 and 15 causes them to engage the distorted areas so that these areas are pulled up and out as the conical member 10 is fed into the case. This is found to return all damaged areas, even those bent over 120°, to usable shape. Furthermore the reject rate using this apparatus is much lower than in the case of hand operation.

Figure 4:
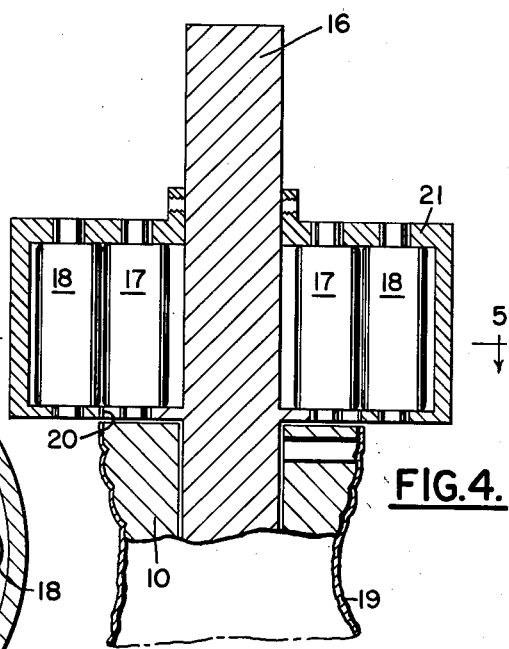
FIG. 4 illustrates a roller assembly which may be provided for the final smoothing of the tubular member.
Figure 5:
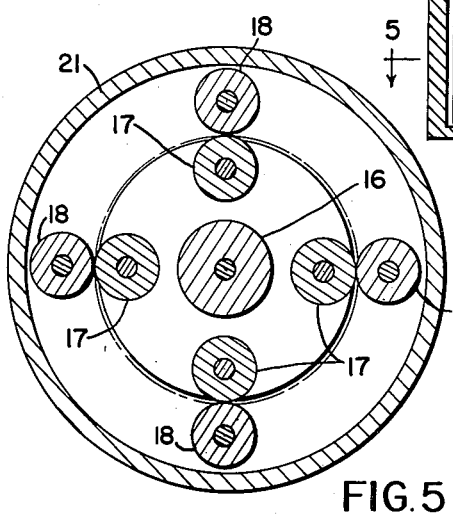
FIG. 5 is a section taken on the line 5—5 of FIG. 4.

In addition to the shape restoring operation described above, the shank 12 (see FIG. 1) may be replaced by a shank 16 as indicated in FIG. 4 to provide a roller assembly for further smoothing the damaged areas. This assembly may include inner rollers 17 and outer rollers 18 (see FIG. 5).

Among the advantages of this invention may be mentioned the inherent tendency for the two threads to frictionally engage opposite inner surface portions of a cartridge case. When the direction of the threads and direction of relative rotation of a cartridge case tend to move the deformed case toward the base of the cone, the case is moved into the opening shown in FIG. 4 for movement of the case in between the rollers 17 and 18.

I claim:

1. In an apparatus for restoring a distorted tubular metal cartridge case to its original form, the combination of a rotatable shank and a conical member fixed to said shank, said conical member having a base of a diameter commensurate with the original inner diameter of said tubular member and having a pair of longitudinally and transversely rounded threads which taper out to zero depth at said base and means including a pair of rollers approximately tangent to each other and arranged to engage the inner and outer surfaces of a cartridge case immediately following the relative travel of said conical member into said cartridge case.

2. An apparatus according to claim 1 in which said pair of rollers are duplicated around the periphery of the rotatable shank.

References Cited in the file of this patent

UNITED STATES PATENTS

| | | |
|---|---|---|
| 496,601 | Edge | May 2, 1893 |
| 795,300 | Nichols | July 25, 1905 |
| 1,685,472 | Watson | Sept. 25, 1928 |
| 1,753,586 | Warwick | Apr. 8, 1930 |
| 1,783,088 | Hill | Nov. 25, 1930 |
| 1,846,437 | Pippin | Feb. 23, 1932 |
| 1,863,034 | Strock | June 14, 1932 |
| 1,930,562 | Krueger | Oct. 17, 1933 |
| 1,955,447 | Wright | Apr. 17, 1934 |
| 1,971,251 | Cornell | Aug. 21, 1934 |
| 2,134,529 | Phillips | Oct. 25, 1938 |
| 2,458,681 | Caliendo | Jan. 11, 1949 |
| 2,550,842 | McClure et al. | May 1, 1951 |
| 2,649,129 | Schlank | Aug. 18, 1953 |
| 2,669,227 | Williams | Feb. 16, 1954 |
| 2,838,773 | Muse | June 17, 1958 |
| 2,888,847 | Younkin | June 2, 1959 |